United States Patent Office 3,616,646
Patented Nov. 2, 1971

1

3,616,646
FORWARD OR AFT STRESS RELIEF FOR A CASE BONDED SOLID PROPELLANT
Alan J. Mikeska, Annandale, and Carl W. Anderson, Jr., Springfield, Va., assignors to the United States of America as represented by the Secretary of the Air Force
Filed Mar. 24, 1970, Ser. No. 22,317
Int. Cl. F02k 9/04
U.S. Cl. 60—255  4 Claims

ABSTRACT OF THE DISCLOSURE

A power mower including five reel-type mower units lant grain and having an elastomeric liner interposed in sealed relation between the propellant grain ends and the walls of the motor body to thereby prevent the flow of hot combustion gases thereinto and thus provide for the relief of critical stress concentrations formed during the firing of the propellant grain.

BACKGROUND OF THE INVENTION

The present invention relates generally to the field of solid rocket technology and, in particular, to a rocket motor body enclosing a case-bonded, solid propellant grain equipped with a built-in stress relief means for counteracting stress concentrations normally found between the ends of the grain and motor body walls.

In the developement of solid rocket motors, one goal has been to design a motor of relatively lightweight and yet strong enough to withstand the temperatures and forces of combustion resulting from the firing of the propellant grain enclosed therein. For this purpose, so-called elastomeric boots or liners have been generally employed to enclose the propellant grain and thus provide a resilient barrier between the grain and the walls of the motor body to thereby absorb both heat and the explosive forces of combustion. An additional problem, somewhat allied thereto, has been the development of stress concentrations during the combustion process as the result, for example, of the flow of hot combustion gases between the propellant grain ends and the inside walls of the motor body. This problem is especially acute with the axially-perforated type of solid propellant grain. This problem is solved, or at least substantially alleviated, by the simple and yet unique means of the present invention, as will be hereinafter summarized and described in detail.

SUMMARY OF THE INVENTION

The present invention consists briefly in providing a solid rocket motor body with a built-in stress relief means by inserting an elastomeric liner between the forward and/or aft end portions of the solid propellant grain enclosed therein and the motor body walls. Additional stress relief and flexible support is provided to the elastomeric liner by the incorporation therewithin of an annular groove that initially reinforces the resistance of the liner to internal stresses formed in the propellant grain during the firing thereof. Subsequently, the remaining web of the main elastomeric liner continues to act to provide further stress relief and thus alleviate any stress concentrations either acting within the grain or otherwise tending to act between the grain and the motor body.

Other advantages, as well as objects of the invention, will become readily apparent from the following disclosure thereof, taken in connection with the accompanying drawings.

2

DESCRIPTION OF THE PREFERRED EMBODIMENT

Figure 1:
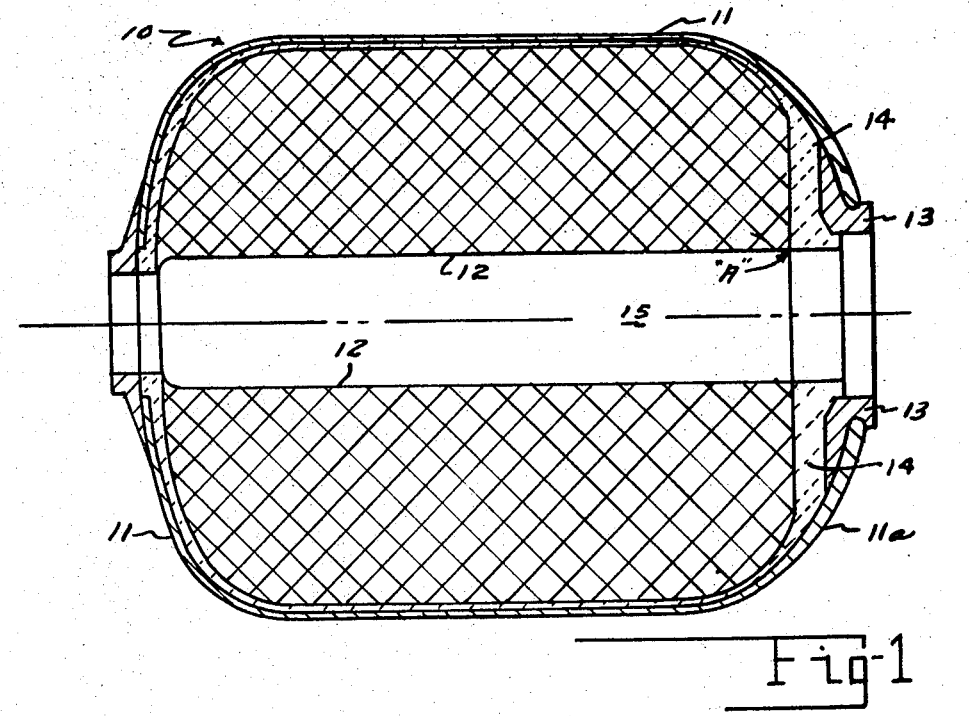
FIG. 1 represents a longitudinal sectional view of a rocket motor body type in which the present invention may be applied, but with the novel stress relief means of the present invention omitted therefrom.

Referring generally to the drawings and, in particular, to FIG. 1 thereof, the rocket motor body type to which the present invention may be applied is illustrated generally at 10 as including the motor body at 11, a solid propellant grain at 12 inclosed therewithin, and the nozzle flange portion at 13 to which any appropriate nozzle (not shown) may be mounted. A layer of insulation is interposed between the propellant grain and the motor body, as is indicated generally at 14. Naturally, to complete the standard type of rocket engine an ignitor would be utilized for insertion in the forward end of the motor body. In view of the confinement of the present arrangement to the improvement of the motor case or body only, the aforesaid ignitor and nozzle are not shown since they form no part of the present invention. Suffice to say, that in general solid propellant rocket engines usually utilize one of three types of solid propellant grains. One type, which is relatively inefficient, because of the space requirements thereof, is a type in which the grain is designed to be burned on both the inner and the outer surfaces thereof at the same time, necessitating the provision of a space between the grain and the wall surfaces of the motor body as well as an opening in the center of the said grain. A second type, which utilizes a constant burning area grain, is a type in which the propellant is designed to be burned on one end only. This suffers the disadvantage that where the burning time is more than just a few seconds the case walls which are exposed, as the propellant burns back, will be melted or weakened enough to cause the rocket to fail. The third type, which is depicted at least schematically in the FIG. 1 of the present invention, is the axially-perforated type whereby the grain is burned internally. To provide for this feature a central and elongated opening, such as that depicted generally at 15 is utilized, which opening also comprises a combustion chamber. With this arrangement combustion starts on the inner grain surface and proceeds towards the inner walls of the motor body; however, during the combustion period the burning surface remains constant. While efficient burning is promoted by the axially-perforated type of grain, the formation of stress concentrations is particularly emphasized.

Figure 2:
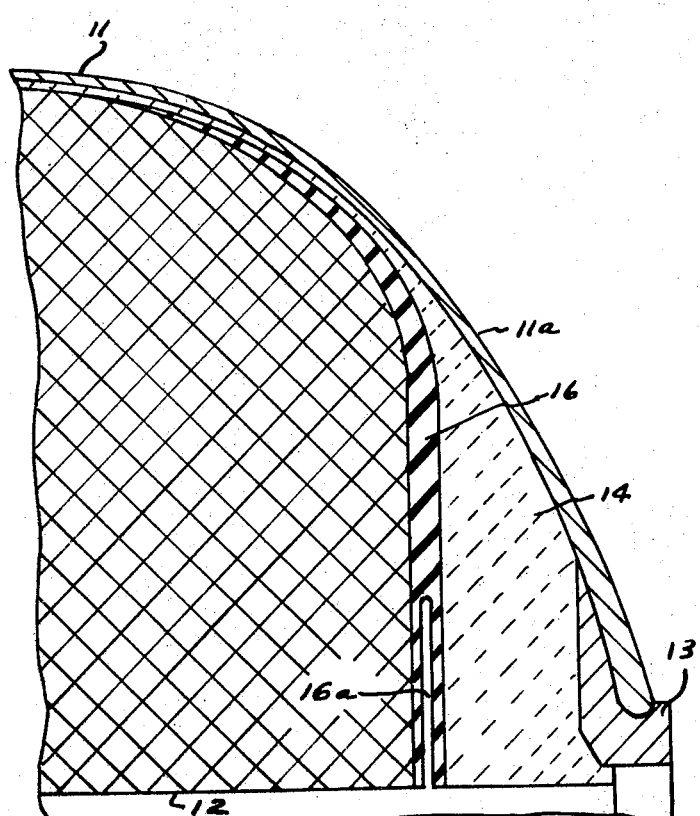
FIG. 2 illustrates a relatively enlarged, longitudinal sectional view, partially broken away, of an aft end portion of the rocket motor body of FIG. 1, but with the unique stress relief liner of the present invention shown assembled thereto.

The ordinary case bonded-type of solid propellant grain and, in particular, the axially perforated type, as at 12 in FIG. 1, is subject to severe stresses after ignition which sets up high propellant stress concentrations, at the junction between the grain and the forward or aft motor body-dome portion, such as is indicated at the arrow marked "A" in FIG. 1 for the aft dome portion 11a. To counteract the said stress concentration at "A," for example, the aft end portion of the motor body 11 may be uniquely equipped with a stress relief liner, as seen at 16 in FIGS. 2 and 3. The stated stress relief function is uniquely accomplished, in particular, by bonding the grain end to the elastomeric line 16 and, in turn, bonding the liner to the motor body by way, of course, of the insulation layer 14. While the entire elastomeric liner 16 performs the principle stress relief function, further and initial stress relief is specifically and peculiarily provided by the use of an annular groove, shown at 16a, which groove extends substantially parallel to the aft end of the grain 12 for a distance preferably less than the web thickness of the said grain. It is noted that any suitable elastomer, such as Buna-S or Silastic rubber may be used. With the aforesaid elastomeric liner 16 mounted as described hereinabove, a two-fold function is assured. First, a flexible support is provided for the ends of the propellant grain, and, secondly, the flow of hot combustion gases into the gap normally formed between the end of the grain and the motor body-aft dome portion 11a, where no elastomeric liner is present, and which might otherwise be produced when the grain is under high stress as when it is initially ignited, is prevented. Moreover, use of the inventive elastomeric bond, as provided in the present invention by the liner 16, further aids in sustaining both lateral and axial acceleration loadings applied to the propellant grain.

Figure 3:
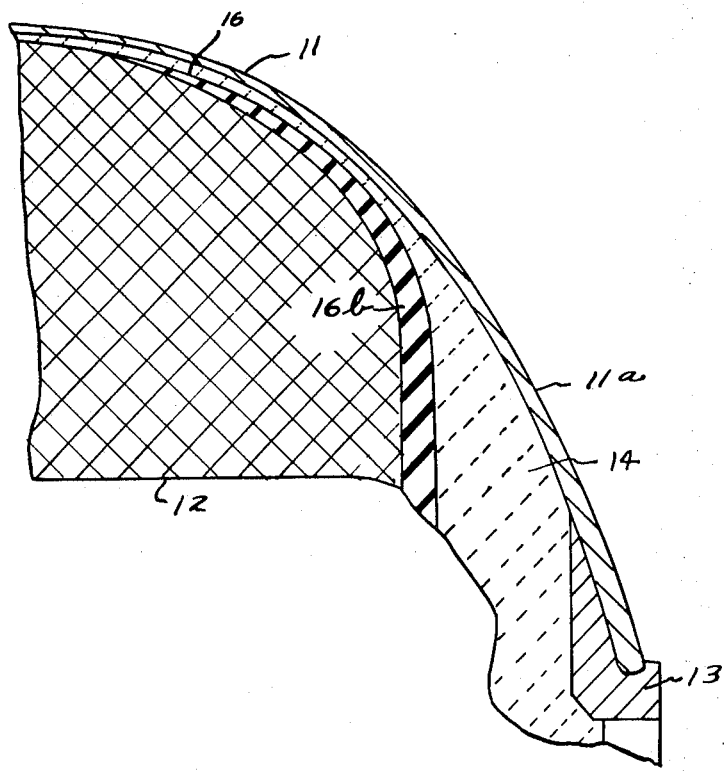
FIG. 3 is still another, relatively enlarged longitudinal sectional view, partly broken-away, of the aft end portion of the rocket motor body shown in FIG. 2, illustrating the condition thereof a finite time after the combustion process has commenced.

In the view of FIG. 3, the function of the new and improved stress relief liner 16 and its annular groove 16a is clearly illustrated. In this regard, the said annular groove 16a provides an additional flexible support built into the elastomeric liner 16, which additional support initially reinforces and thereby tends to further counteract the main resistance of the liner 16 to the initial severe stresses set up in the grain 12 during the initial firing thereof. This additional flexible support provided by the web groove 16a is largely effective until a finite time after ignition. At this point, the propellant has burned past the web groove 16a. However, the aft portion of the inventive liner 16 naturally remains bonded, as before, to the aft motor body dome 11a and therefore remains essentially intact to serve as a continual barrier to the combustion gas which would otherwise flow between the grain-aft end and the motor body 11. Since, at this point in the combustion process, the stress situation is no longer as severe, the flexibility of the liner and its remaining aft fillet, indicated generally at 16b, will provide ample stress relief for the remainder of the firing. Thus, any stress concentration that might otherwise have resulted, for example, at the point "A" (FIG. 1) would be substantially countered and significantly reduced.

We claim:

1. In a solid rocket motor body having forward and aft dome portions, and a centrally-disposed and longitudinally extending passageway forming a combustion chamber including opposed end portions extending through and thereby forming an opening in each of said forward and aft dome portions; a case bonded solid propellant grain positioned within, and having an axial perforation coinciding with, said combustion end portions said propellant grain further having opposite end portions respectively and indirectly joined to each of said forward and aft dome portions; insulation means in contact with the inner wall surfaces of said rocket motor body along the entire circumference thereof and extending from a relatively thin, intermediately-positioned, insulation-portion to a relatively thick, insulation-portion at least at the aft dome portion; primary stress relief means mounted within said body in interposed relation between, and in contacting relation with, said opposite grain end portions and the insulation means of said forward and aft dome portions, said primary stress relief means incorporating a first, stress relief-portion of relatively enlarged thickness oriented at, and extending inwardly from the forward and aft dome portions to gradually reduce in thickness to a second, integral stress relief-portion of relatively reduced thickness and terminating in a minimum thickness at a preselected distance along the circumference of said body from both of said forward and aft dome portions to thereby provide stress relief to the rocket motor body progressively varying in magnitude from a minimum at the preselected body position inwardly from the forward and aft ends thereof, to a maximum at the said dome portions, said primary stress relief means being thereby positioned to block the flow of hot combustion gases into the gap normally found between each propellant grain end portion and motor dome portion and thus counter any stress concentrations normally found thereat and resulting therefrom during the firing of said grain; said primary stress relief means further constituting a first, flexible support means resiliently resisting uneven expansion and both lateral and acceleration loadings on the said propellant grain to thereby further reduce stress concentrations in the rocket motor body, and having auxiliary stress relief means built into the interior of said primary stress relief means and consisting of a second, flexible support means acting in concert with said first, flexible support means, for an initial period of propellant grain-burning, to thereby initially resist uneven expansion of, and thus reinforce the stress relief provided to the grain by said primary stress relief means, particularly during the ignition thereof and for a specified period thereafter.

2. In a solid rocket motor body as in claim 1, wherein said first, flexible support means may be bonded between the said opposite end portions of said propellant grain and the said motor body to thereby resist both internal stresses produced within said grain during the firing thereof, and the stresses resulting from both lateral and axial acceleration loads being applied to said grain during flight operations.

3. In a solid rocket motor body as in claim 1, wherein said primary stress relief means comprises a resilient member interconnected in sealed relation between the ends of said propellant grain and the insulation means in contact with the forward and aft dome portions.

4. In a solid rocket motor body as in claim 1, wherein said primary stress relief means comprises an elastomeric liner bonded between, and thereby providing resilient support to, the opposite end portions of said propellant grain, and said auxiliary stress relief means comprises an annular groove incorporated in said elastomeric liner, said annular groove being oriented within the interior of said elastomeric liner at a position and in a plane perpendicular to the longitudinal axis of the propellant grain surrounding, and in open communication with, said combustion chamber nearly adjacent to the opposite end portions of said grain, said groove thereby ensuring the built-in provision of an initial stress relief substantially reinforcing the stress relief provided by the elastomeric liner of said primary stress relief means to said propellant grain until a finite period after initiation of the firing of said grain.

References Cited
UNITED STATES PATENTS

| | | | |
|---|---|---|---|
| 3,270,502 | 9/1966 | Silver | 60—255 |
| 2,986,001 | 5/1961 | Green | 60—255 |
| 3,446,018 | 5/1969 | Macbeth | 60—255 X |
| 3,362,159 | 1/1968 | Heesacker | 102—103 X |
| 3,269,113 | 8/1966 | Crews et al. | 60—255 |

DOUGLAS HART, Primary Examiner

R. B. ROTHMAN, Assistant Examiner